US012773628B2

(12) United States Patent
Liu

(10) Patent No.: US 12,773,628 B2
(45) Date of Patent: Oct. 27, 2026

(54) VIRTUAL PROP CONTROL METHOD AND APPARATUS, COMPUTER-READABLE STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Zhihong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 237 days.

(21) Appl. No.: 18/654,992

(22) Filed: May 3, 2024

(65) Prior Publication Data

US 2024/0286035 A1 Aug. 29, 2024

Related U.S. Application Data

(63) Continuation of application No. 17/553,784, filed on Dec. 16, 2021, now Pat. No. 12,005,356, which is a (Continued)

(30) Foreign Application Priority Data

Oct. 31, 2019 (CN) ......................... 201911063217.6

(51) Int. Cl.

*A63F 13/5255* (2014.01)
*A63F 13/2145* (2014.01)
(Continued)

(52) U.S. Cl.

CPC ...... *A63F 13/5255* (2014.09); *A63F 13/2145* (2014.09); *A63F 13/5372* (2014.09);
(Continued)

(58) Field of Classification Search

None
See application file for complete search history.

(56) References Cited

U.S. PATENT DOCUMENTS 10,905,955 B2 2/2021 Lin et al.
10,933,310 B2 3/2021 Li
(Continued)

FOREIGN PATENT DOCUMENTS

CN 107029425 A 8/2017
CN 107678647 A 2/2018
(Continued)

OTHER PUBLICATIONS

The State Intellectual Property Office of the People's Republic of China (SIPO) Office Action 1 for for 201911063217.6 Aug. 31, 2020 11 Pages (including translation).
(Continued)

*Primary Examiner* — Jason T Yen
(74) *Attorney, Agent, or Firm* — ANOVA LAW GROUP, PLLC

(57) ABSTRACT

A virtual prop control method includes: displaying a crosshair of a virtual shooting prop in a game scene of a virtual shooting game; detecting whether an aiming ray of the virtual shooting prop is in contact with adhesion boxes of other virtual operation objects in response to an input operation of the target virtual operation object, the aiming ray representing a direction aimed by the crosshair, the input operation including a target touch operation on a display screen that displays the game scene; and determining, from the non-target virtual operation objects corresponding to the contacted adhesion boxes, an adhesion target of the virtual shooting prop during shooting of the virtual shooting prop.

17 Claims, 6 Drawing Sheets

Related U.S. Application Data continuation of application No. PCT/CN2020/116200, filed on Sep. 18, 2020.

(51) Int. Cl.
*A63F 13/5372* (2014.01)
*A63F 13/837* (2014.01)

(52) U.S. Cl.
CPC .... *A63F 13/837* (2014.09); *A63F 2300/1075* (2013.01); *A63F 2300/306* (2013.01); *A63F 2300/6676* (2013.01); *A63F 2300/8076* (2013.01)

(56) References Cited

U.S. PATENT DOCUMENTS

| | | | | |
|---|---|---|---|---|
| 2004/0063501 | A1 | 4/2004 | Shimokawa et al. | |
| 2010/0009734 | A1 | 1/2010 | Sambongi et al. | |
| 2015/0031421 | A1 | 1/2015 | Jo et al. | |
| 2015/0157940 | A1 | 6/2015 | Hall | |
| 2016/0067611 | A1 | 3/2016 | Ware et al. | |
| 2016/0287990 | A1* | 10/2016 | Garvin | A63F 13/525 |
| 2019/0060767 | A1 | 2/2019 | Shao | |
| 2019/0126148 | A1* | 5/2019 | Wei | A63F 13/2145 |
| 2020/0285370 | A1 | 9/2020 | Hao et al. | |
| 2021/0031106 | A1* | 2/2021 | Alderman | A63F 13/35 |
| 2021/0101074 | A1 | 4/2021 | Hemby et al. | |

FOREIGN PATENT DOCUMENTS

| | | | |
|---|---|---|---|
| CN | 107885417 | A | 4/2018 |
| CN | 108404407 | A | 8/2018 |
| CN | 108415639 | A | 8/2018 |
| CN | 109529327 | A | 3/2019 |
| CN | 109847366 | A | 6/2019 |
| CN | 110841276 | A | 2/2020 |
| WO | 2019057164 | A1 | 3/2019 |

OTHER PUBLICATIONS

The World Intellectual Property Organization (WIPO) International Search Report for PCT/CN2020/116200 Dec. 17, 2020 5 Pages (including translation).

* cited by examiner

VIRTUAL PROP CONTROL METHOD AND APPARATUS, COMPUTER-READABLE STORAGE MEDIUM, AND ELECTRONIC DEVICE

CROSS-REFERENCES TO RELATED APPLICATIONS

This application is a continuation of U.S. application Ser. No. 17/553,784 filed on Dec. 16, 2021; U.S. application Ser. No. 17/553,784 is a continuation application of PCT Patent Application No. PCT/CN2020/116200, filed on Sep. 18, 2020, which claims priority to Chinese Patent Application No. 2019110632176, entitled "VIRTUAL PROP CONTROL METHOD AND APPARATUS, STORAGE MEDIUM, AND ELECTRONIC DEVICE" filed with the China National Intellectual Property Administration on Oct. 31, 2019, the entire contents of all of which are incorporated herein by reference.

FIELD OF THE TECHNOLOGY

The present disclosure relates to the field of games, and specifically, to a virtual prop control method and apparatus, a non-transitory computer-readable storage medium, and an electronic device.

BACKGROUND OF THE DISCLOSURE

With the popularization of portable mobile terminals such as mobile phones. It is increasingly common for people to use mobile phones for entertainment, that is, playing shooting games.

In a current mobile shooting game, operating on the mobile phone is difficult due to a relatively small screen, which is not as convenient as operating a virtual operation object on a computer with a larger screen. Therefore, some auxiliary functions need to be added to help a player operate more easily. An adhesion function is added to most shooting games, and generating adhesion is merely a most basic effect. However, the implementation and selection of adhesion are different. There is a problem of how to help the player select a target that best meets requirements of the player for a program when a plurality of targets simultaneously fall into an adhesion site.

SUMMARY

Various embodiments of the present disclosure provide a virtual prop control method and apparatus, a computer-readable storage medium, and an electronic device.

According to an aspect of the embodiments of the present disclosure, a virtual prop control method is provided, performed by an electronic device. The method includes: displaying a crosshair of a virtual shooting prop in a game scene of a virtual shooting game, the virtual shooting prop being controlled by a target virtual operation object in the virtual shooting game; detecting whether an aiming ray of the virtual shooting prop is in contact with an adhesion box of at least one non-target virtual operation object in response to an input operation of the target virtual operation object, the aiming ray representing a direction aimed by the crosshair, the input operation comprising a target touch operation on a display screen that displays the game scene; and determining, from the at least one non-target virtual operation object corresponding to the contacted adhesion box, an adhesion target of the virtual shooting prop during shooting of the virtual shooting prop.

According to another aspect of the embodiments of the present disclosure, a virtual prop control apparatus is further provided, disposed in an electronic device, the apparatus including: a display unit, configured to display a crosshair of a virtual shooting prop in a game scene of a virtual shooting game, the virtual shooting prop being controlled by a target virtual operation object in the virtual shooting game; a detection unit, configured to detect whether an aiming ray of the virtual shooting prop is in contact with an adhesion box of at least one non-target virtual operation object in response to an input operation of the target virtual operation object, the aiming ray representing a direction aimed by the crosshair, the input operation including a target touch operation on a display screen that displays the game scene; and a first determining unit, configured to determine, from the at least one non-target virtual operation object corresponding to the contacted adhesion box, an adhesion target of the virtual shooting prop during shooting of the virtual shooting prop.

According to still another aspect of the embodiments of the present disclosure, one or more non-transitory computer-readable storage media are further provided, the computer-readable storage medium storing computer-readable instructions, the computer-readable instructions being configured to perform, when run, a virtual prop control method including: displaying a crosshair of a virtual shooting prop in a game scene of a virtual shooting game, the virtual shooting prop being controlled by a target virtual operation object in the virtual shooting game; detecting whether an aiming ray of the virtual shooting prop is in contact with an adhesion box of at least one non-target virtual operation object in response to an input operation of the target virtual operation object, the aiming ray representing a direction aimed by the crosshair, the input operation comprising a target touch operation on a display screen that displays the game scene; and determining, from the at least one non-target virtual operation object corresponding to the contacted adhesion box, an adhesion target of the virtual shooting prop during shooting of the virtual shooting prop.

According to still another aspect of the embodiments of the present disclosure, an electronic device is further provided, including a memory, a processor, and computer-readable instructions stored on the memory and executable on the processor, the processor is configured to perform: displaying a crosshair of a virtual shooting prop in a game scene of a virtual shooting game, the virtual shooting prop being controlled by a target virtual operation object in the virtual shooting game; detecting whether an aiming ray of the virtual shooting prop is in contact with an adhesion box of at least one non-target virtual operation object in response to an input operation of the target virtual operation object, the aiming ray representing a direction aimed by the crosshair, the input operation comprising a target touch operation on a display screen that displays the game scene; and determining, from the at least one non-target virtual operation object corresponding to the contacted adhesion box, an adhesion target of the virtual shooting prop during shooting of the virtual shooting prop.

Details of one or more embodiments of the present disclosure are provided in the accompanying drawings and descriptions below. Based on the specification, the accompanying drawings, and the claims of the present disclosure, other features, objectives, and advantages of the present disclosure become clearer.

BRIEF DESCRIPTION OF THE DRAWINGS

To describe the technical solutions of the embodiments of the present disclosure more clearly, the accompanying drawings required for describing the embodiments is briefly described below. Apparently, the accompanying drawings in the following description show merely some embodiments of the present disclosure, and a person of ordinary skill in the art may still derive other drawings according to the accompanying drawings without creative efforts.

DESCRIPTION OF EMBODIMENTS

To make a person skilled in the art better understand the solutions of the present disclosure, the technical solution in the embodiments of the present disclosure is clearly and completely described below with reference to the accompanying drawings in the embodiments of the present disclosure. Apparently, the described embodiments are merely some of the embodiments of the present disclosure rather than all of the embodiments. All other embodiments obtained by a person of ordinary skill in the art based on the embodiments of the present disclosure without creative efforts shall fall within the protection scope of the present disclosure.

In this specification, the terms such as "first" and "second" in the specification, the claims, and the foregoing accompanying drawings of the present disclosure are intended to distinguish between similar objects, but are not necessarily used for describing a particular sequence or a chronological order. It is to be understood that the data used in such a way is interchangeable in proper circumstances, so that the embodiments of the present disclosure described herein can be implemented in other orders other than the order illustrated or described herein. Moreover, the terms "include", "contain" and any other variants mean to cover the non-exclusive inclusion. For example, a process, method, system, product, or device that includes a list of steps or units is not necessarily limited to those expressly listed steps or units, but may include other steps or units not expressly listed or inherent to such a process, method, system, product, or device.

According to an embodiment of the present disclosure, a method embodiment of a virtual prop control method is further provided. Steps shown in the flowchart of the accompanying drawings may be performed, for example, in a computer system storing a group of computer executable instructions. In addition, although a logic sequence is shown in the flowchart, in some cases, the shown or described steps may be performed in a sequence different from the sequence described herein.

The virtual prop control method in the embodiments of the present disclosure is described in detail below.

Figure 1:
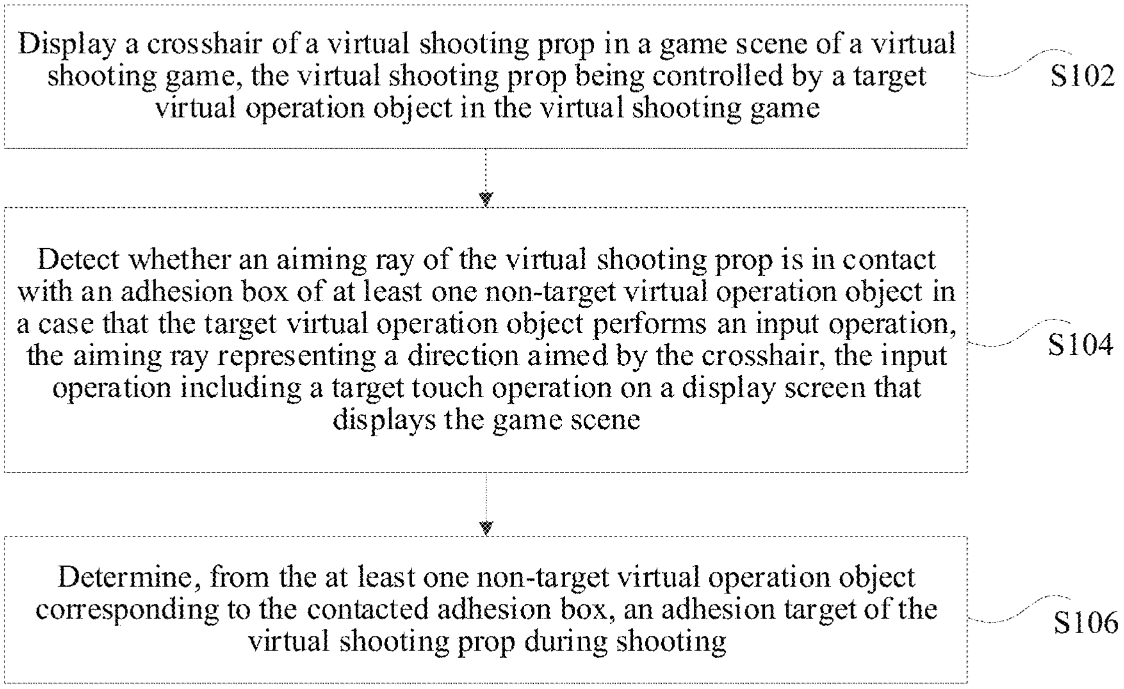
FIG. 1 is a flowchart of a virtual prop control method according to an embodiment of the present disclosure.

FIG. 1 is a flowchart of a virtual prop control method according to an embodiment of the present disclosure. The virtual prop control method may be performed by a terminal, or performed by a server, or jointly performed by a server and a terminal. As shown in FIG. 1, the virtual prop control method includes the following steps:

Step S102. Display a crosshair of a virtual shooting prop in a game scene of a virtual shooting game, the virtual shooting prop being controlled by a target virtual operation object in the virtual shooting game.

Step S104. Detect whether an aiming ray of the virtual shooting prop is in contact with an adhesion box of at least one non-target virtual operation object in response to an input operation of the target virtual operation object, the aiming ray representing a direction aimed by the crosshair, the input operation including a target touch operation on a display screen, and the display screen being configured to display the game scene. In some embodiments, the input operation of the target virtual operation object may refer to the target touch operation performed by a user that controls the target virtual operation object.

The at least one non-target virtual operation object refers to virtual operation objects other than the target virtual operation object in the virtual shooting game. It may be understood that, in response to an input operation of the target virtual operation object, whether the aiming ray of the virtual shooting prop is in contact with the adhesion box of the at least one non-target virtual operation object may be detected. When the aiming ray is not in contact with the adhesion box, the adhesion target may not be determined; and when the aiming ray is in contact with the adhesion box of the at least one non-target virtual operation object, the adhesion target may be determined.

Step S106. Determine, from the at least one non-target virtual operation object corresponding to the contacted adhesion box, an adhesion target of the virtual shooting prop during shooting.

It may be understood that, there may be one or a plurality of adhesion boxes that are in contact with the aiming ray, and the "plurality of" herein indicates at least two.

In an embodiment, when the aiming ray is in contact with only one adhesion box (that is, the aiming ray is in contact with an adhesion box of one non-target virtual operation object, and the non-target virtual operation object corresponding to the adhesion box is the first virtual operation object), the first virtual operation object corresponding to the one adhesion box is determined as the adhesion target of the virtual shooting prop during shooting, the at least one non-target virtual operation object including the first virtual operation object.

According to the foregoing steps: a crosshair of a virtual shooting prop is displayed in a game scene of a virtual shooting game, the virtual shooting prop being controlled by a target virtual operation object in the virtual shooting game; whether an aiming ray of the virtual shooting prop is in contact with an adhesion box of at least one non-target virtual operation object is detected in response to an input operation of the target virtual operation object, the aiming ray representing a direction aimed by the crosshair, the input operation including a target touch operation on a display screen, and the display screen being configured to display the game scene; and the absorption target of the virtual shooting prop during shooting is determined from the at least one non-target virtual operation object corresponding to the contacted adhesion box, thereby achieving a technical effect of detecting whether the aiming ray is in contact with the adhesion box of the at least one non-target virtual operation object merely in response to an input operation of the target virtual operation object, and further resolving a technical problem of relatively low efficiency in detecting the adhesion box of the target virtual operation object in a conventional method.

In other words, the target virtual operation object in the game may not detect whether an enemy falls into a detection range of the crosshair in each frame during moving, and detection is performed merely when an enemy (e.g., a user controlling one non-contact virtual operation object) performs an input operation. The input operation refers to screen operations such as firing and moving. Detection is not performed when the target virtual operation object is idle, to reduce unnecessary computation costs.

In the solution of step S102, on a game interface displayed on a mobile terminal, a crosshair of a virtual shooting prop controlled by a target virtual operation object in a game is displayed. The crosshair is a crosshair for the virtual prop to perform a shooting operation on another virtual operation object. In an actual application, a red mark is displayed on the another virtual operation object when the crosshair is projected onto a non-target virtual operation object.

The game may be shooting games including, but not limited to, all games that use hot weapons for ranged attacks, including first-person shooting games and third-person shooting games, such as PUBG Mobile (Game for Peace).

In the solution of step S104, a game terminal is configured to detect whether an aiming ray of the virtual shooting prop is in contact with an adhesion box of at least one non-target virtual operation object merely in response to an input operation of the target virtual operation object.

The adhesion box is configured for each virtual operation object before a game.

In other words, a corresponding adhesion box is configured for each virtual operation object participating in the virtual shooting game before displaying a crosshair of a virtual shooting prop in a game scene of the virtual shooting game, the adhesion box of each virtual operation object being a collision detection region in a predetermined shape, and the collision detection region moving along with movement of the corresponding virtual operation object. The predetermined shape may include, but is not limited to a rectangle.

Figure 2:
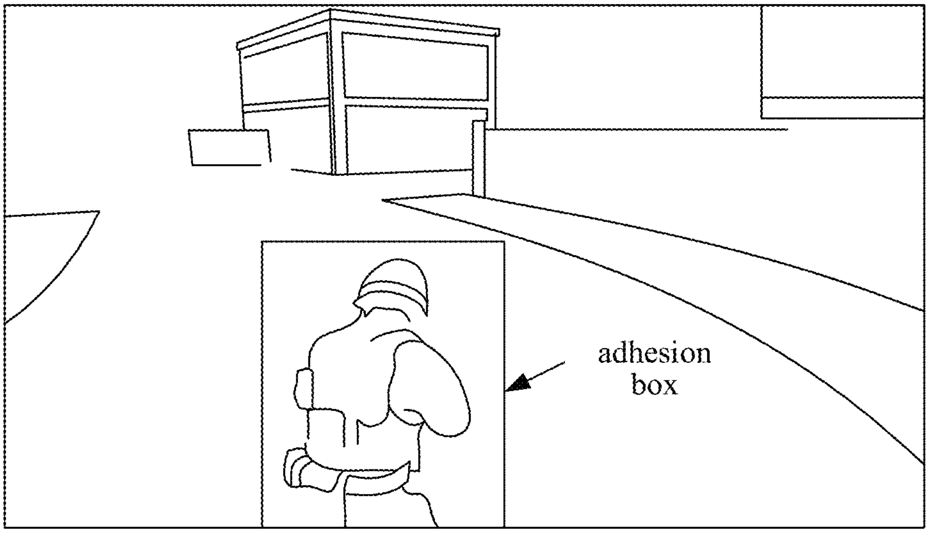
FIG. 2 is a schematic diagram of a virtual operation object configured with an adhesion box according to an embodiment of the present disclosure.

In an actual application, a full-traverse manner will not be used, instead, a rectangular collision detection box (hereinafter collectively referred to as the adhesion box) is added to each virtual operation object individually. A ray is emitted in a direction aimed by the crosshair. The virtual operation object in which the ray is located may be obtained when the ray is in contact with the adhesion box, and then a player target that needs to be adhered may be obtained. Target adhesion is a function of a system to automatically help the player aim at a target faster and more accurately. FIG. 2 is a schematic diagram of a virtual operation object configured with an adhesion box.

A non-target virtual operation object is determined as the adhesion target of the virtual shooting prop during shooting when the aiming ray is in contact with just one adhesion box of a non-target virtual operation object, thereby improving a hit rate of the virtual shooting prop.

In an optional embodiment, the detecting whether an aiming ray of the virtual shooting prop is in contact with an adhesion box of at least one non-target virtual operation object in response to an input operation of the target virtual operation object may include: detecting the adhesion box of the at least one non-target virtual operation object that is in contact with the aiming ray of the virtual shooting prop (or detecting whether the aiming ray of the virtual shooting prop is in contact with the adhesion box of the at least one non-target virtual operation object) in response to an input operation of the target virtual operation object, the input operation including at least one operation of a moving operation, a shooting operation, or a rotation operation.

For example, whether the aiming ray of the virtual shooting prop is in contact with the adhesion box of the at least one non-target virtual operation object is detected when the target virtual operation object moves forward.

In an embodiment, the determining, from the at least one non-target virtual operation object corresponding to the contacted adhesion box, the adhesion target of the virtual shooting prop during shooting includes: determining, when the aiming ray is in contact with adhesion boxes of a plurality of non-target virtual operation objects simultaneously, a second virtual operation object closest to the crosshair among the plurality of non-target virtual operation objects as the adhesion target of the virtual shooting prop during shooting. The at least one non-target virtual operation object includes the second virtual operation object. In other words, a non-target virtual operation object closest to the crosshair is determined as the adhesion target of the virtual shooting prop during shooting when the aiming ray is in contact with adhesion boxes of a plurality of non-target virtual operation objects simultaneously, which is equivalent to the "principle of proximity".

The determining a second virtual operation object closest to the crosshair among the plurality of non-target virtual operation objects as the adhesion target of the virtual shooting prop during shooting may include: obtaining first projection positions of positions of the plurality of non-target virtual operation objects projected onto a predetermined plane and a second projection position of the aiming ray projected onto the predetermined plane. A position of the crosshair includes the second projection position. The second virtual operation object whose first projection position is closest to the second projection position among the plurality of non-target virtual operation objects is determined as the adhesion target.

Figure 3:
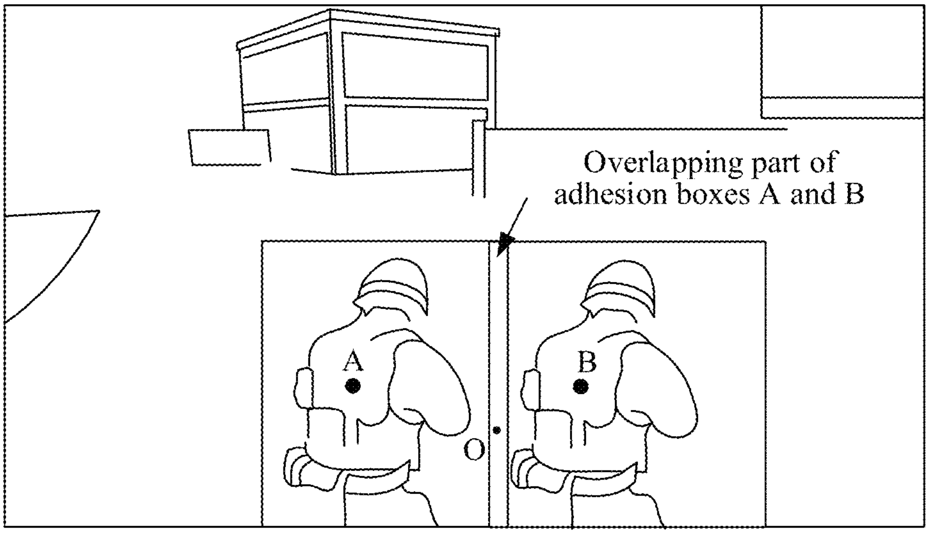
FIG. 3 is a schematic diagram of aimed virtual operation objects A and B, and a point O aimed by a crosshair according to an embodiment of the present disclosure.

For example, the target virtual operation object, a non-target virtual operation object A, and a non-target virtual operation object B are provided. The target virtual operation object controls the virtual shooting prop and is in contact with the adhesion boxes of the non-target virtual operation object A and the non-target virtual operation object B by using the aiming ray. FIG. 3 is a schematic diagram of aimed non-target virtual operation objects A and B, and a point O aimed by the crosshair.

An aiming ray of the crosshair may detect two non-target virtual operation objects A and B, and the point O aimed by the crosshair, that is, three points in total. The three points are not on the same plane. Therefore, a switch needs to be made to project the three points onto a UI screen, and distances OA and OB are calculated. When OA is shorter than OB, an adhesion effect is generated on the non-target virtual operation object A, and the ray is rotated in a direction of the non-target virtual operation object A; otherwise, the ray is rotated in a direction of the non-target virtual operation object B.

In an embodiment, the foregoing method may further include: obtaining, when the virtual shooting prop has an adhesion target, a fire trajectory of a virtual bullet fired by the virtual shooting prop at the adhesion target; and determining that the virtual bullet hits the adhesion target when the fire trajectory is not in contact with the adhesion target, but a distance between the fire trajectory and the adhesion target is less than a predetermined threshold.

With reference to the foregoing embodiments, an embodiment of the present disclosure provides a method for determining an adhesion target in a shooting game.

Figure 4:
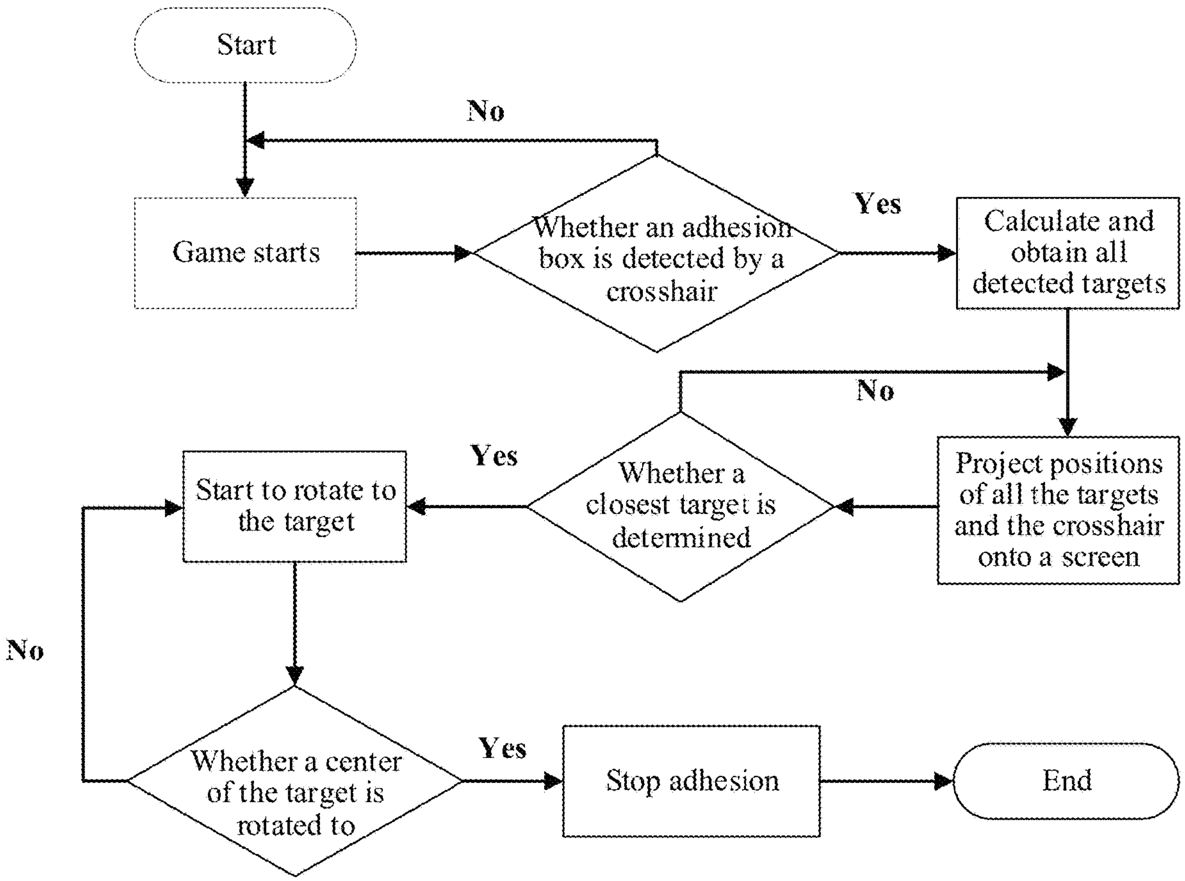
FIG. 4 is a flowchart of a method for determining an adhesion target in a shooting game according to an embodiment of the present disclosure.

FIG. 4 is a flowchart of a method for determining an adhesion target in a shooting game according to an exemplary embodiment of the present disclosure. As shown in FIG. 4, the method includes the following steps:

Step 1: Start.

In step 1, a game in a mobile terminal is run.

Step 2: A game starts.

In step 2, a shooting game is started, that is, firing of a first bullet in the game means that the game starts.

Step 3: Determine whether an adhesion box is detected by a crosshair, if yes, perform step 4; and if no, continue to perform the determination step.

The determining whether an adhesion box is detected by a crosshair refers to determining whether the crosshair is in contact with an adhesion box.

Before the game, an adhesion box is previously configured for each virtual operation object in the game, and the adhesion box may be in a two-dimensional or three-dimensional form. A character in the game may not detect whether an enemy falls into a detection range of the crosshair in each frame during moving, and detection is performed merely when the enemy performs an input operation. The input operation refers to screen operations such as firing and moving. Detection is not performed when the character is idle, to reduce unnecessary computation costs.

Step 4: Calculate and obtain all detected targets.

The detected target is a virtual operation object corresponding to the detected adhesion box.

Step 5: Project positions of all the targets and the crosshair onto a screen.

In other words, points in different spaces are projected onto the same plane. The position of the target is a position of the virtual operation object corresponding to the detected adhesion box.

Step 6: Whether a closest target is determined, if yes, perform step 7; and if no, perform step 5.

Step 7: Start to rotate to the target.

Step 8: Determine whether an aiming ray is rotated to a center of the target, if yes, perform step 9; and if no, perform step 7.

It may be understood that, the "target" in steps 6 to 9 is the virtual operation object.

Step 9: Stop adhesion.

Step 10: End.

According to the foregoing steps, the steps of the exemplary embodiment are briefly described as follows:

Step I: The character (that is, the target virtual operation object in the game) may not detect whether an enemy falls into a detection range of the crosshair in each frame during moving, and detection is performed merely in response to an input operation of the target virtual operation object. The input operation refers to screen operations such as firing and moving. Detection is not performed when the target virtual operation object is idle, to reduce unnecessary computation costs.

Figure 5:
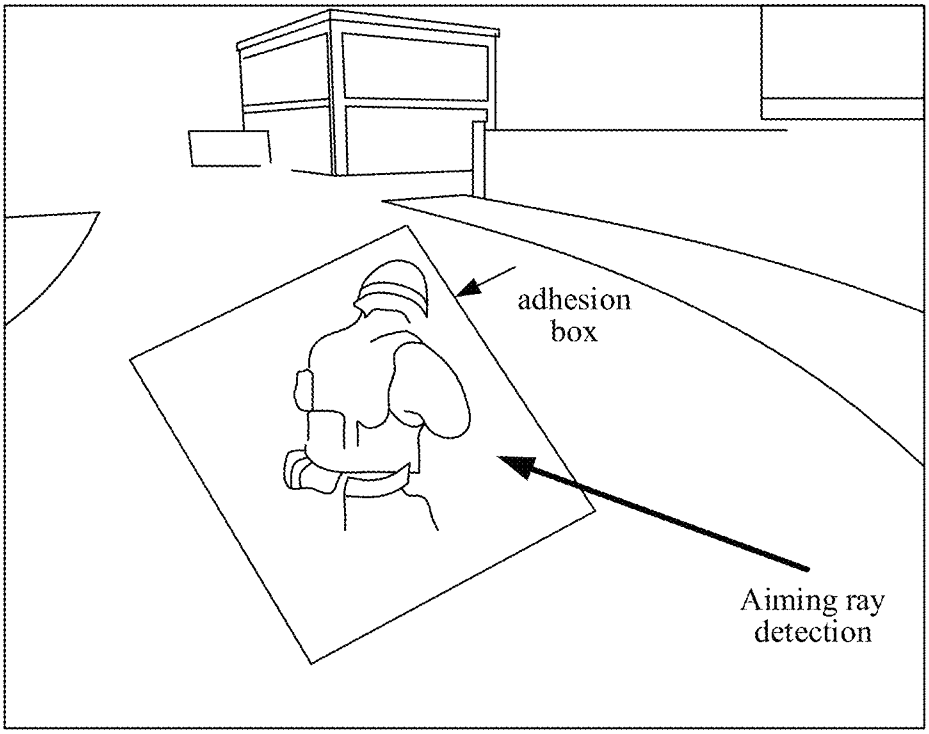
FIG. 5 is a schematic diagram of detecting a target adhesion box according to an embodiment of the present disclosure.

Step II: When an adhesion box of an enemy (a shot virtual operation object, namely, a non-target virtual operation object) enters the detection range of the crosshair, and the player (an object controlling the target virtual operation object) performs an input operation, the adhesion box may be detected and an adhesion effect is started to generate. It may be understood that, the player may perform a touch operation on a display screen, that is, generate an input operation, and the target virtual operation object controlled by the player may perform the input operation. A manner of detecting the adhesion box is shown in FIG. 5, which is a schematic diagram of detecting a target adhesion box. FIG. 5 shows a schematic plan view of the adhesion box obtained through three-dimensional projection.

A size of the adhesion box is configured by a planner. The adhesion box is hung on the character (the virtual operation object in the game). Therefore, all information such as a position and a current status of the player may be obtained as long as the adhesion box is detected.

Step III: When there is merely one target, adhesion is directly generated; and when there are a plurality of targets, positions of the plurality of targets (virtual operation objects) need to be projected onto a screen, where a projection manner includes: obtaining a camera with a screen UI; and inputting word coordinates of each character into an interface of the camera, to directly return coordinate positions on the screen. In this case, all distances to a position of the crosshair need to be calculated respectively, and a target with a smallest distance is the adhesion target after all the distances are calculated.

Step IV: After the target is selected, the aiming ray may be rotated to the target until the aiming ray moves to the target or the adhesion box of the target moves out of the detection range of the crosshair.

Step V: Repeat the foregoing process of selecting a target and generating adhesion after the adhesion ends until the game is over.

According to the foregoing exemplary embodiment, a target adhesion object may be accurately selected for the target virtual operation object when there are a plurality of non-target virtual operation objects, so that the virtual shooting prop may accurately hit the virtual operation object. In addition, an adhesion box is configured for each virtual operation object in advance, in this way, as long as the aiming ray is in contact with the adhesion box, the virtual operation object in which the aiming ray is located may be obtained without using a full-traverse manner.

For ease of description, the foregoing method embodiments are stated as a series of action combinations. However, a person skilled in the art is to learn that the present disclosure is not limited to the described sequence of the actions, because according to the present disclosure, some steps may be performed in another sequence or may be simultaneously performed. In addition, a person skilled in the art is also to learn that the embodiments described in this specification are all exemplary embodiments, and the involved actions and modules are not necessarily required by the present disclosure.

Figure 6:
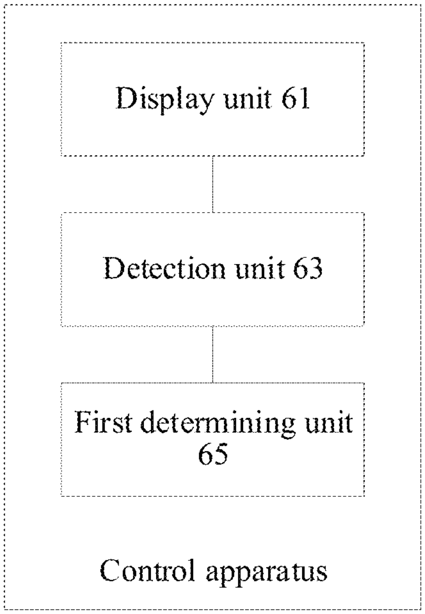
FIG. 6 is a schematic structural diagram of a virtual prop control apparatus according to an embodiment of the present disclosure.

According to another aspect of the embodiments of the present disclosure, a virtual prop control apparatus configured to implement the foregoing virtual prop control method is further provided. As shown in FIG. 6, the virtual prop control apparatus may include: a display unit 61, a detection unit 63, and a first determining unit 65.

The display unit 61 is configured to display a crosshair of a virtual shooting prop in a game scene of a virtual shooting game, the virtual shooting prop being controlled by a target virtual operation object in the virtual shooting game.

The detection unit 63 is configured to detect whether an aiming ray of the virtual shooting prop is in contact with an adhesion box of at least one non-target virtual operation object in response to an input operation of the target virtual operation object, the aiming ray representing a direction aimed by the crosshair, the input operation including a target touch operation on a display screen, and the display screen being configured to display the game scene.

The first determining unit 65 is configured to determine, from the at least one non-target virtual operation object corresponding to the contacted adhesion box, an adhesion target of the virtual shooting prop during shooting.

In an embodiment, the first determining unit 65 is further configured to determine, when the aiming ray is in contact with a single adhesion box, a first virtual operation object corresponding to the single adhesion box as the adhesion target of the virtual shooting prop during shooting, the at least one non-target virtual operation object including the first virtual operation object.

In an embodiment, the foregoing detection unit 63 may include: a detection module, configured to detect whether the aiming ray of the virtual shooting prop is in contact with the adhesion box of the at least one non-target virtual operation object in response to an input operation of the target virtual operation object, the input operation including at least one operation of a moving operation, a shooting operation, and a rotation operation.

Figure 7:
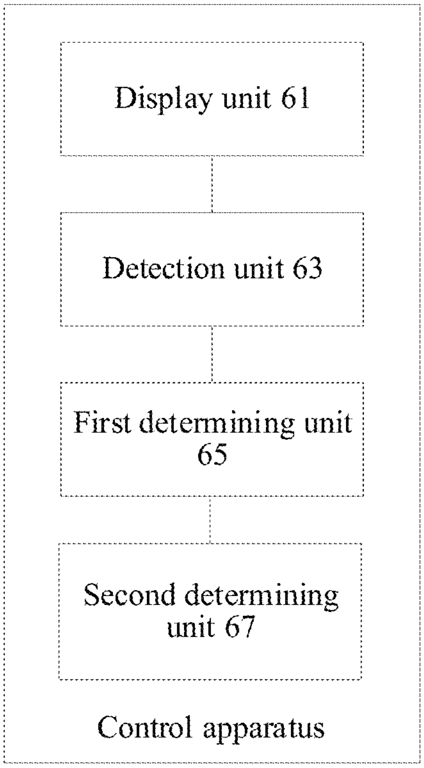
FIG. 7 is a schematic structural diagram of another virtual prop control apparatus according to an embodiment of the present disclosure.

In an embodiment, as shown in FIG. 7, another virtual prop control apparatus may include: a display unit 61, a detection unit 63, and a first determining unit 65, and may further include a second determining unit 67.

The second determining unit 67 is configured to determine, when the aiming ray is in contact with adhesion boxes of a plurality of non-target virtual operation objects simultaneously, a second virtual operation object closest to the crosshair among the plurality of non-target virtual operation objects as the adhesion target of the virtual shooting prop during shooting.

The foregoing second determining unit may include: an obtaining module, configured to obtain first projection positions of positions of the plurality of non-target virtual operation objects projected onto a predetermined plane and a second projection position of the aiming ray projected onto the predetermined plane, a position of the crosshair including the second projection position; and a determining module, configured to determine the second virtual operation object whose first projection position is closest to the second projection position among the plurality of non-target virtual operation objects as the adhesion target.

In an embodiment, the foregoing apparatus may further include: a configuration unit, configured to configure a corresponding adhesion box for each virtual operation object participating in the virtual shooting game before displaying a crosshair of a virtual shooting prop in a game scene of a virtual shooting game, the adhesion box of each virtual operation object being a collision detection region in a predetermined shape, and the collision detection region moving along with movement of the corresponding virtual operation object.

In an embodiment, the foregoing apparatus may further include: an obtaining unit, configured to obtain, when the virtual shooting prop has an adhesion target, a fire trajectory of a virtual bullet fired by the virtual shooting prop at the adhesion target; and a third determining unit, configured to determine that the virtual bullet hits the adhesion target when the fire trajectory is not in contact with the adhesion target, but a distance between the fire trajectory and the adhesion target is less than a predetermined threshold.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 8:
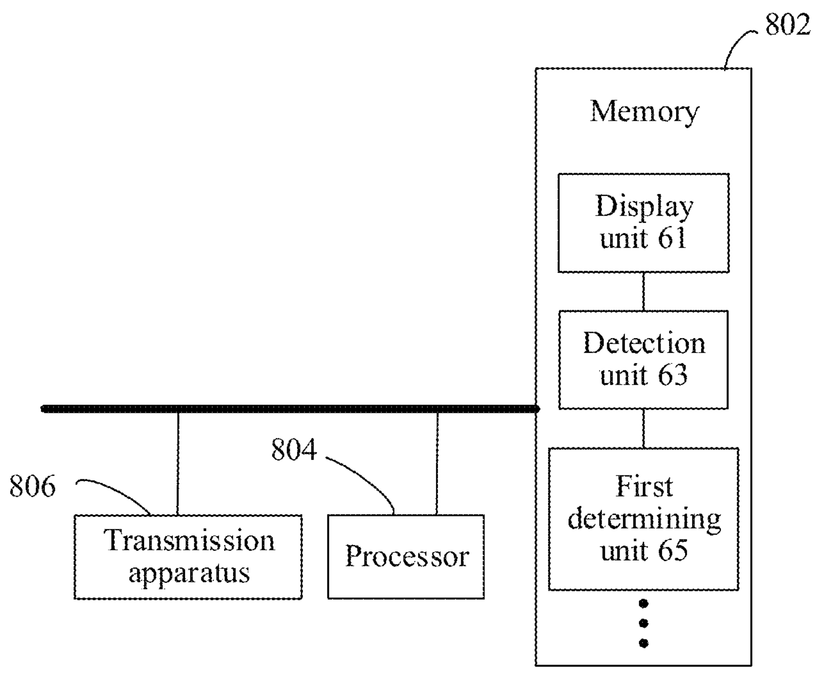
FIG. 8 is a schematic structural diagram of an electronic device in a virtual prop control method according to an embodiment of the present disclosure.

According to still another aspect of the embodiments of the present disclosure, an electronic device configured to implement the foregoing virtual prop control method is further provided. As shown in FIG. 8, the electronic device includes a memory 802 and a processor 804. The memory 802 stores computer-readable instructions, and the processor 804 is configured to perform the steps in any one of the foregoing method embodiments when executing the computer-readable instructions.

In an embodiment, the foregoing electronic device may be located in at least one of a plurality of network devices in a computer network.

In an embodiment, the foregoing processor may be configured to perform the following steps when executing the computer-readable instructions:

S1. Display a crosshair of a virtual shooting prop in a game scene of a virtual shooting game, the virtual shooting prop being controlled by a target virtual operation object in the virtual shooting game.

S2. Detect whether an aiming ray of the virtual shooting prop is in contact with an adhesion box of at least one non-target virtual operation object in response to an input operation of the target virtual operation object, the aiming ray representing a direction aimed by the crosshair, the input operation including a target touch operation on a display screen, and the display screen being configured to display the game scene.

S3. Determine, from the at least one non-target virtual operation object corresponding to the contacted adhesion box, an adhesion target of the virtual shooting prop during shooting.

In an embodiment, a person of ordinary skill in the art may understand that, the structure shown in FIG. 8 is merely illustrative. The electronic device may be alternatively a terminal device such as a smartphone (for example, an Android phone, or an iOS phone), a tablet computer, a palmtop computer, a mobile Internet device (MID), or a PAD. FIG. 8 does not constitute a limitation on the structure of the foregoing electronic device. For example, the electronic device may alternatively include more or fewer components (for example, network interfaces) than those shown in FIG. 8, or have a configuration different from that shown in FIG. 8.

The memory 802 may be configured to store software programs and modules, for example, program instructions/modules corresponding to the virtual prop control method and apparatus in the embodiments of the present disclosure. The processor 804 runs the software programs and modules stored in the memory 802, to perform various functional applications and data processing, namely, implement the foregoing virtual prop control method. The memory 802 may include a high-speed random memory, and may also include a non-volatile memory, for example, one or more magnetic storage apparatuses, a flash memory, or another nonvolatile solid-state memory. In some embodiments, the memory 802 may further include memories remotely disposed relative to the processor 804, and the remote memories may be connected to a terminal through a network. Examples of the network include, but are not limited to, the Internet, an intranet, a local area network, a mobile communication network, and a combination thereof. The memory 802 may be specifically configured to, but is not limited to, store information such as shooting times of the virtual shooting prop, and a movement trajectory of the target virtual operation object. In an example, as shown in FIG. 8, the memory 802 may include, but is not limited to, the display unit 61, the detection unit 63, and the first determining unit 65 in the foregoing virtual prop control apparatus. In addition, the memory may further include, but is not limited to, other module units in the virtual prop control apparatus. The other module units are not described in detail in this example.

In an embodiment, a transmission apparatus 806 is configured to receive or transmit data by using a network. Specific examples of the foregoing network may include a wired network and a wireless network. In an example, the transmission apparatus 806 includes a network interface controller (NIC). The NIC may be connected to another network device and a router by using a network cable, so as to communicate with the Internet or a local area network. In an example, the transmission apparatus 806 is a radio frequency (RF) module, which communicates with the Internet in a wireless manner.

According to still another aspect of the embodiments of the present disclosure, one or more computer-readable storage media are further provided. The computer-readable storage medium stores computer-readable instructions, the computer-readable instructions being configured to perform, when run, the steps in any one of the foregoing method embodiments.

In an embodiment, the foregoing computer-readable storage medium may be configured to store computer-readable instructions for performing the following steps:

S1. Display a crosshair of a virtual shooting prop in a game scene of a virtual shooting game, the virtual shooting prop being controlled by a target virtual operation object in the virtual shooting game.

S2. Detect whether an aiming ray of the virtual shooting prop is in contact with an adhesion box of at least one non-target virtual operation object in response to an input operation of the target virtual operation object, the aiming ray representing a direction aimed by the crosshair, the input operation including a target touch operation on a display screen, and the display screen being configured to display the game scene.

S3. Determine, from the at least one non-target virtual operation object corresponding to the contacted adhesion box, an adhesion target of the virtual shooting prop during shooting.

In an embodiment, a person of ordinary skill in the art may understand that all or some of the steps of the methods in the foregoing embodiments may be implemented by a program instructing relevant hardware of the terminal device. The program may be stored in a computer-readable storage medium, and the storage medium may include a flash disk, a read-only memory (ROM), a random access memory (RAM), a magnetic disk, an optical disc, or the like.

The sequence numbers of the foregoing embodiments of the present disclosure are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of the present disclosure essentially, or a part contributing to the related art, or all or a part of the technical solution may be implemented in a form of a software product. The computer software product is stored in a storage medium and includes several instructions for instructing one or more computer devices (which may be a PC, a server, a network device, or the like) to perform all or some of steps of the methods in the embodiments of the present disclosure.

In the foregoing embodiments of the present disclosure, the descriptions of the embodiments have respective focuses. For a part that is not described in detail in an embodiment, refer to related descriptions in other embodiments.

In the several embodiments provided in the present disclosure, it is to be understood that, the disclosed client may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the present disclosure may be integrated into one processing unit, or each of the units may be physically separated, or two or more units may be integrated into one unit. The integrated unit may be implemented in the form of hardware, or may be implemented in a form of a software functional unit.

The foregoing descriptions are merely exemplary implementations of the present disclosure. A person of ordinary skill in the art may further make several improvements and modifications without departing from the principle of the present disclosure, and the improvements and modifications fall within the protection scope of the present disclosure.

What is claimed is:

1. A virtual prop control method, performed by an electronic device, the method comprising:

displaying a crosshair of a target virtual operation object in a virtual shooting game;

detecting whether an aiming ray corresponding to the crosshair is in contact with an adhesion box of at least one non-target virtual operation object in response to a user input, the aiming ray representing a direction aimed by the crosshair; and determining, when the aiming ray is in contact with adhesion boxes of a plurality of non-target virtual operation objects simultaneously, a second virtual operation object closest to the crosshair among the plurality of non-target virtual operation objects as an adhesion target of the crosshair during a movement of the crosshair, comprising:

obtaining first projection positions of positions of the plurality of non-target virtual operation objects projected onto a target plane and a second projection position of the aiming ray projected onto the target plane; and determining the second virtual operation object whose first projection position is closest to the second projection position among the plurality of non-target virtual operation objects as the adhesion target.

2. The virtual prop control method according to claim 1, wherein a point aimed by the crosshair and at least two of the plurality of non-target virtual operation objects in contact with the aiming ray are located at different planes.

3. The virtual prop control method according to claim 1, further comprising:

in response to determining the second virtual operation object as the adhesion target, rotating the aiming ray in a direction of the second virtual operation object.

4. The virtual prop control method according to claim 1, wherein the input operation comprises at least one operation of a moving operation, a shooting operation, or a rotation operation.

5. The virtual prop control method according to claim 1, wherein the method further comprises:

configuring a corresponding adhesion box for each virtual operation object participating in the virtual shooting game, the adhesion box of each virtual operation object being a collision detection region in a predetermined shape, and the collision detection region moving along with movement of the corresponding virtual operation object.

6. The virtual prop control method according to claim 1, further comprising:

obtaining a fire trajectory of a virtual bullet fired by the target virtual operation object at the adhesion target; and determining that the virtual bullet hits the adhesion target in response to that the fire trajectory is not in contact with the adhesion target and that a distance between the fire trajectory and the adhesion target is less than a predetermined threshold.

7. A virtual prop control apparatus, comprising: a memory and one or more processors, the memory storing computer-readable instructions, the one or more processors being configured, when executing the computer-readable instructions, to:

display a crosshair of a target virtual operation object in a virtual shooting game;

detect whether an aiming ray corresponding to the crosshair is in contact with an adhesion box of at least one non-target virtual operation object in response to a user input, the aiming ray representing a direction aimed by the crosshair; and determine, when the aiming ray is in contact with adhesion boxes of a plurality of non-target virtual operation objects simultaneously, a second virtual operation object closest to the crosshair among the plurality of non-target virtual operation objects as an adhesion target of the crosshair during a movement of the crosshair, comprising:

obtaining first projection positions of positions of the plurality of non-target virtual operation objects projected onto a target plane and a second projection position of the aiming ray projected onto the target plane; and determining the second virtual operation object whose first projection position is closest to the second projection position among the plurality of non-target virtual operation objects as the adhesion target.

8. The virtual prop control apparatus according to claim 7, wherein a point aimed by the crosshair and at least two of the plurality of non-target virtual operation objects in contact with the aiming ray are located at different planes.

9. The virtual prop control apparatus according to claim 7, wherein the processor is further configured to:

in response to determining the second virtual operation object as the adhesion target, rotate the aiming ray in a direction of the second virtual operation object.

10. The virtual prop control apparatus according to claim 7, wherein the input operation comprises at least one operation of a moving operation, a shooting operation, or a rotation operation.

11. The virtual prop control apparatus according to claim 7, wherein the processor is further configured to:

configure a corresponding adhesion box for each virtual operation object participating in the virtual shooting game before the displaying the crosshair, the adhesion box of each virtual operation object being a collision detection region in a predetermined shape, and the collision detection region moving along with movement of the corresponding virtual operation object.

12. The virtual prop control apparatus according to claim 7, wherein the processor is further configured to:

obtain a fire trajectory of a virtual bullet fired by the target virtual operation object at the adhesion target; and determine that the virtual bullet hits the adhesion target when the fire trajectory is not in contact with the adhesion target, but a distance between the fire trajectory and the adhesion target is less than a predetermined threshold.

13. One or more non-transitory computer-readable storage media, the computer-readable storage medium comprising stored computer-readable instructions, the computer-readable instructions, when run by a processor, causing the processor to perform:

displaying a crosshair of a target virtual operation object in a virtual shooting game;

detecting whether an aiming ray corresponding to the crosshair is in contact with an adhesion box of at least one non-target virtual operation object in response to a user input, the aiming ray representing a direction aimed by the crosshair; and determining, when the aiming ray is in contact with adhesion boxes of a plurality of non-target virtual operation objects simultaneously, a second virtual operation object closest to the crosshair among the plurality of non-target virtual operation objects as an adhesion target of the crosshair during a movement of the crosshair, comprising:

obtaining first projection positions of positions of the plurality of non-target virtual operation objects projected onto a target plane and a second projection position of the aiming ray projected onto the target plane; and determining the second virtual operation object whose first projection position is closest to the second projection position among the plurality of non-target virtual operation objects as the adhesion target.

14. The one or more non-transitory computer-readable storage media according to claim 13, wherein a point aimed by the crosshair and at least two of the plurality of non-target virtual operation objects in contact with the aiming ray are located at different planes.

15. The one or more non-transitory computer-readable storage media according to claim 13, wherein the computer-readable instructions further cause the processor to perform:

in response to determining the second virtual operation object as the adhesion target, rotating the aiming ray in a direction of the second virtual operation object.

16. The one or more non-transitory computer-readable storage media according to claim 13, wherein the input operation comprises at least one operation of a moving operation, a shooting operation, or a rotation operation.

17. The one or more non-transitory computer-readable storage media according to claim 13, wherein the computer-readable instructions further cause the processor to perform:

configuring a corresponding adhesion box for each virtual operation object participating in the virtual shooting game, the adhesion box of each virtual operation object being a collision detection region in a predetermined shape, and the collision detection region moving along with movement of the corresponding virtual operation object.

* * * * *